Patented Oct. 27, 1925.

1,559,343

UNITED STATES PATENT OFFICE.

DIEDERICUS JOHANNES MEYERINGH AND PETRUS CAREL WIJNAND, OF AMSTERDAM, NETHERLANDS.

PROCESS FOR THE PREPARATION OF A DYED RUBBER PRODUCT.

No Drawing.     Application filed December 26, 1923. Serial No. 682,824.

*To all whom it may concern:*

Be it known that we, DIEDERICUS JOHANNES MEYERINGH and PETRUS CAREL WIJNAND, subjects of the Queen of the Netherlands, residing at Amsterdam, the Netherlands, have invented certain new and useful Improvements in Processes for the Preparation of a Dyed Rubber Product, of which the following is a specification.

The invention relates to a process for the preparation of a new product that may be used for a great number of purposes.

The new product may be substituted for linoleum, carpets, stair-carpets and similar floor coverings and also for leather and other linings. The new product may also be used on account of its special properties in place of colored glass and ordinary window-glass.

As raw material is used rubber in the broadest sense of the word. Plantation rubber in sheet or crêpe form may be used, also the so-called slab rubber and even latex. Mixtures of the above mentioned rubber materials may also be used, and also admixed with smaller or greater additions of gut-tapercha. Finally, practically all filling means, which are used in rubber technics, may be added.

The process, according to the invention, comprises taking rubber, in the above mentioned broad sense, or even latex, and treating it with a dye solution, the solvent of which exercises a solving action on the rubber as well as on the dyes.

In order to obtain a greater surface and the desired thickness of the final product, the rubber, (and the latex after coagulation) after treatment with the dye solution is led under moderate pressure between rolls. In this way can be combined a plurality of sheets into a greater surface. The durability, and color together with the hardness of the product, can be varied by adding of sulphur according to the invention, to the rubber or to the latex, or to the dye solution (together with the optional use of accelerators) and also the filling means, such as are used in rubber practice. Finally, the resistance capacity of the product may be raised by exposing it for some time after these treatments to warmth, sunlight and actinic rays.

Hereunder, a process for the manufacture of floormats is described in order to clearly explain the invention.

Sheets of plantation rubber are passed through a dye solution, which contains a small percentage of sulphur. The dye solution may be composed of organic or inorganic coloring matters, which have been dissolved in organic or inorganic solvents. The solvent must not only be able to dissolve the dye, but must also be able to exercise a more or less dissolving action on the rubber. As solvents, for example, may be used benzol and its homologues, carbon-disulphide, and the like. The sheets are covered with this solvent dye solution, by sprinkling or spraying, or preferably by passing the sheets through a bath of the dye solution. As has already been observed, one may add sulphur to the solution or else mix the rubber sheets with sulphur, in advance.

Afterwards the sheets are brought to the desired thickness and size by leading them under moderate pressure between rolls, either cold or warmed. By exposing the sheets to warmth or to actinic rays for which the sunlight may be used, the desired product is obtained.

The applying of special figures can be accomplished with the aid of engraved rolls, which obtain their portion of the dye solution in any known manner. When applying sulphur there is preferably used one of the known accelerators, which have been commonly used in rubber practice these last years. The quantity of sulphur, however, amounts only to about 4%.

As was already observed above, one can manufacture a great number of articles according to this invention. By taking greater quantities of sulphur and by the exact choice of the dye solution one can obtain harder products, which are transparent and may be substituted for colored glass. Also products are obtainable, which can be substituted for ordinary window-glass. In this case the quantity of dye must be very small.

We claim:

1. A process for the production of rubber dyed throughout, comprising treating raw rubber in sheet form with a solution of coloring matter the solvent in the coloring matter solution being capable of penetrating into and throughout the rubber treated, the raw rubber being treated with sulphur, and the resulting product being vulcanized with actinic rays.

2. A process for the production of rubber dyed throughout, comprising, treating raw rubber in sheet form with a solution of coloring matter, the solvent in the coloring matter solution being capable of penetrating into and throughout the rubber treated, then passing the treated rubber between rollers under a moderate pressure, and then adding sulfur and vulcanizing with actinic rays.

In testimony whereof we affix our signatures.

DIEDERICUS JOHANNES MEYERINGH.
PETRUS CAREL WIJNAND.